(12) United States Patent
Liu (10) Patent No.: US 7,340,715 B2
(45) Date of Patent: *Mar. 4, 2008

(54) VISUAL PROGRAMMING METHOD AND SYSTEM THEREOF

(76) Inventor: Hanbai Liu, 17056 Colima Rd, #226, Hacienda Heights, CA (US) 91745

( * ) Notice: Subject to any disclaimer, the term of this patent is extended or adjusted under 35 U.S.C. 154(b) by 702 days.

This patent is subject to a terminal disclaimer.

(21) Appl. No.: 10/798,729

(22) Filed: Mar. 10, 2004

(65) Prior Publication Data

US 2005/0204336 A1    Sep. 15, 2005

(51) Int. Cl.
*G06F 9/44* (2006.01)
(52) U.S. Cl. .................. 717/105; 717/109; 717/113
(58) Field of Classification Search ......... 717/105–113
See application file for complete search history.

(56) References Cited

U.S. PATENT DOCUMENTS

| 4,860,204 | A | * | 8/1989 | Gendron et al. | ............ | 717/109 |
| 5,862,379 | A | * | 1/1999 | Rubin et al. | ................ | 717/109 |
| 6,055,369 | A | * | 4/2000 | Sawahata et al. | ........... | 717/109 |
| 6,421,821 | B1 | * | 7/2002 | Lavallee | ..................... | 717/109 |
| 6,934,938 | B2 | * | 8/2005 | May et al. | ................... | 717/132 |

* cited by examiner

*Primary Examiner*—Wei Zhen
*Assistant Examiner*—Phillip H Nguyen
(74) *Attorney, Agent, or Firm*—Raymond Y. Chan; David and Raymond Patent Firm (57) ABSTRACT

A visual programming system includes one or more function modules each of which is provided with an applicable functional program or command stored in computer executable language in a processing unit to accomplish a substantial applicable function, one or more determination modules each of which is provided with a determining test stored in computer executable language in the processing unit, and programming flow lines connecting the function modules and determination modules in a predetermined sequence to construct a visual graphic program that can be compiled to machine readable codes so as to construct a finish program in computer executable language in a processing unit.

20 Claims, 4 Drawing Sheets

VISUAL PROGRAMMING METHOD AND SYSTEM THEREOF

BACKGROUND OF THE PRESENT INVENTION

1. Field of Invention

The present invention relates to programming method, and more particularly to a visual programming method and system thereof that allows users to produce and/or amend computer programs by constructing function modules and/or determination modules with programming flow lines, without the need of learning, understanding and memorizing rules and syntax of advanced programming languages and avoid the trouble of computing and debugging lengthy source codes.

2. Description of Related Arts

While computers are getting more and more popular, most users still find themselves being confined by designed programs and software which are developed in the hope of satisfying all who uses them. Users can hardly change the software themselves, despite how they find the software difficult to use. The reason is that programs and software designing and computing requires knowledge and skills in conventional advanced programming languages such as Fortran, C, C++, and Java. Indeed, these programming languages provide high flexibility for creating programs or software, but, however, are difficult to understand and require a strong memory of all the syntax.

Even those who have the skills and knowledge in those programming languages will find getting a set of source code to compile frustrating. As soon as there is a slightest syntax error, such as a missing close bracket, the whole program simply cannot compile. Debugging requires a huge amount of time and expertise. It is basically impossible for people having average computing knowledge to custom make their own software, despite how good an idea a person has. Using conventional programming languages, an idea must be converted into source code before it can be developed into software.

It would be even more difficult to try to improve on the already written program later on due to the fact that source codes are very difficult to follow and understand. A lot of people have shared the same experience of rather rewriting the whole program from scratch than trying to improve on the existing source code.

Conventional programmable software comprises an editor and a compiler. The editor allows a user to input a desired set of source code using human readable codes. These human readable codes are not understandable by machines. As a result, after a set of source codes has been edited through the editor using the particular compiled language that the programmable software recognizes, for example C++ is recognized by Microsoft Visual C++, the compiler converts the set of source code into machine readable codes of a computer executable language so that the computer can understand the command and perform the desired functions of the users.

Even though conventional programmable software provide a high flexibility in creating programs and software, they are only beneficial to people who have acquired the knowledge in how to compute source codes in advanced programming languages. In order to custom make a program to operate the business, some companies hire programmers to produce their own programs to fit their private needs and applications. However, when the companies improve or modify their managements and operations, they cannot amend or modify their programs to adapt the corresponding changes without the help of the programmers who have the source codes of their programs that substantially creates a lot troublesome to the company users.

Therefore, in order to allow ordinary people to enjoy the flexibility of creating and amending programs and software according to their own need and desire without having to go into the trouble of learning, understanding and memorizing awkward syntax of advanced programming languages, a better source code editor must be created.

SUMMARY OF THE PRESENT INVENTION

A main object of the present invention is to provide a visual programming method and system thereof that allows users to produce computer programs by constructing function modules and/or determination modules with programming flow lines, without the need of learning, understanding and memorizing rules and syntax of advanced programming languages and avoid the trouble of computing and debugging lengthy source codes.

Another object of the present invention is to provide a visual programming method and system thereof for computer programs so as to allow users to amend the computer programs anytime to fit their private needs and applications by themselves without the need of learning, understanding and memorizing rules and syntax of advanced programming languages and avoid the trouble of computing and debugging lengthy source codes.

Another object of the present invention is to enable users to input a program without having to understand any particular advanced program languages.

Another object of the present invention is to provide a visual programming method and system thereof, wherein machine readable codes of programs designed by professional programmers can be converted back into human readable codes, allowing users to perform changes to the programs.

Another object of the present invention is to provide a visual programming method and system thereof, wherein the user selectable commands are in the form of boxes and lines, as a result, the outlook of the finished program is as simple as like a flow chart and the production of the finished program is as easy as making a flow chart too.

In order to accomplish the above objects, the present invention provides a visual programming system which comprises:

one or more function modules each of which is provided with an applicable functional program or command stored in computer executable language in a processing unit to accomplish a substantial applicable function;

one or more determination modules each of which is provided with a determining test stored in computer executable language in the processing unit; and programming flow lines connecting the function modules and determination modules in a predetermined sequence to construct a visual graphic program which is compiled to machine readable codes so as to construct a finish program in the computer executable language in the processing unit.

DETAILED DESCRIPTION OF THE PREFERRED EMBODIMENT

According to FIG. 1 to FIG. 5, a visual programming method and system thereof according to a preferred embodiment of the present invention is illustrated. The visual programming system comprises one or more function modules 10, one or more determination modules 20, and programming flow lines 30 connecting the function modules 10 and the determination modules 20, if any, in a designated executable logic structure to form a logic structure language for producing a finished visual graphic program.

Each of the function modules 10 comprises an applicable functional program or command stored in computer executable language in a processing unit 2 to accomplish a substantial applicable function. Each of the function modules 10 has at least a connecting entrance 11 and a connecting exit 12 for illustrating the executing sequence of the function modules 10, wherein the connecting exit 12 substantially illustrates which function module 10 or determination module 20 is the next module to be connected from this function module 10 after this function module has executed its function or whether such visual graphic program has been completed.

The applicable function can be (i) an independent process such as "Compute the Inputted Data with a Specific Formula", "Compile Saved Process"; (ii) a controllable object such as "Turn Off the Television"; (iii) an event such as, "Import Event" and "Add New Record", or (iv) a matter such as "Begin Affair" and "Variable", etc . . .

Each of the determination modules 20 comprises a determination program or command (Determining Test), stored in computer executable language in the processing unit 2, for determining the "True" or "False" of any information to be tested, so as to determine the flowing direction of a processing event, such as to determine whether a "Variable Value" equals to "100" or whether there is any "Limitation" for a computer user, etc . . . The determination module 20 has a determination entrance 21 to illustrate which previous module 10 or 20 after executed is connected to this determination module 20 for executing a specific "Determining Test". The determination module 20 further has a "True" exit 22 and a "False" exit 23. When the result of the determination program or command is "True", the executing direction of the processing event will be executed via the "True" exit 22 (i.e. the bottom direction of the determination module 20 in rhombic shape). When the result of the determination program or command is "False", the executing direction of the processing event will be executed towards the "False" exit 23 (i.e. the left or right direction of the determination module 20 in rhombic shape).

The programming flow lines 30 are used to connect the function modules 10 and the determination modules 20. In addition, the programming flow lines 30 illustrate the executing sequence of the modules 10 and 20, so as to construct a logic sequence of an "Event Function". It is worth to mention that, any connection between modules 10 and/or 20 with the programming flow line 30 does not need to have actual internal communicating relationship of the program but for illustrating a kind of executing sequence between the modules 10 and/or 20. In other words, each of the function module 10 and the determination module 20 stores an application function and the programming flow lines 30 are used to illustrate the executing sequence of such application functions so as to form the visual graphic program.

According to the present invention, although the human readable codes are not required because the construction of the function modules 10, determination modules 20 and programming flow lines 30 are displayed by the computer via the monitor thereof as human visual graphic program which directly represents the computer executable language to be stored in the computer to operate and function, in order to better illustrate the present invention, the conventional human readable codes, i.e. the source codes, of conventional program languages such as C++ and Java can be used as an interface between the visual graphic program and the computer executable language.

Figure 1:
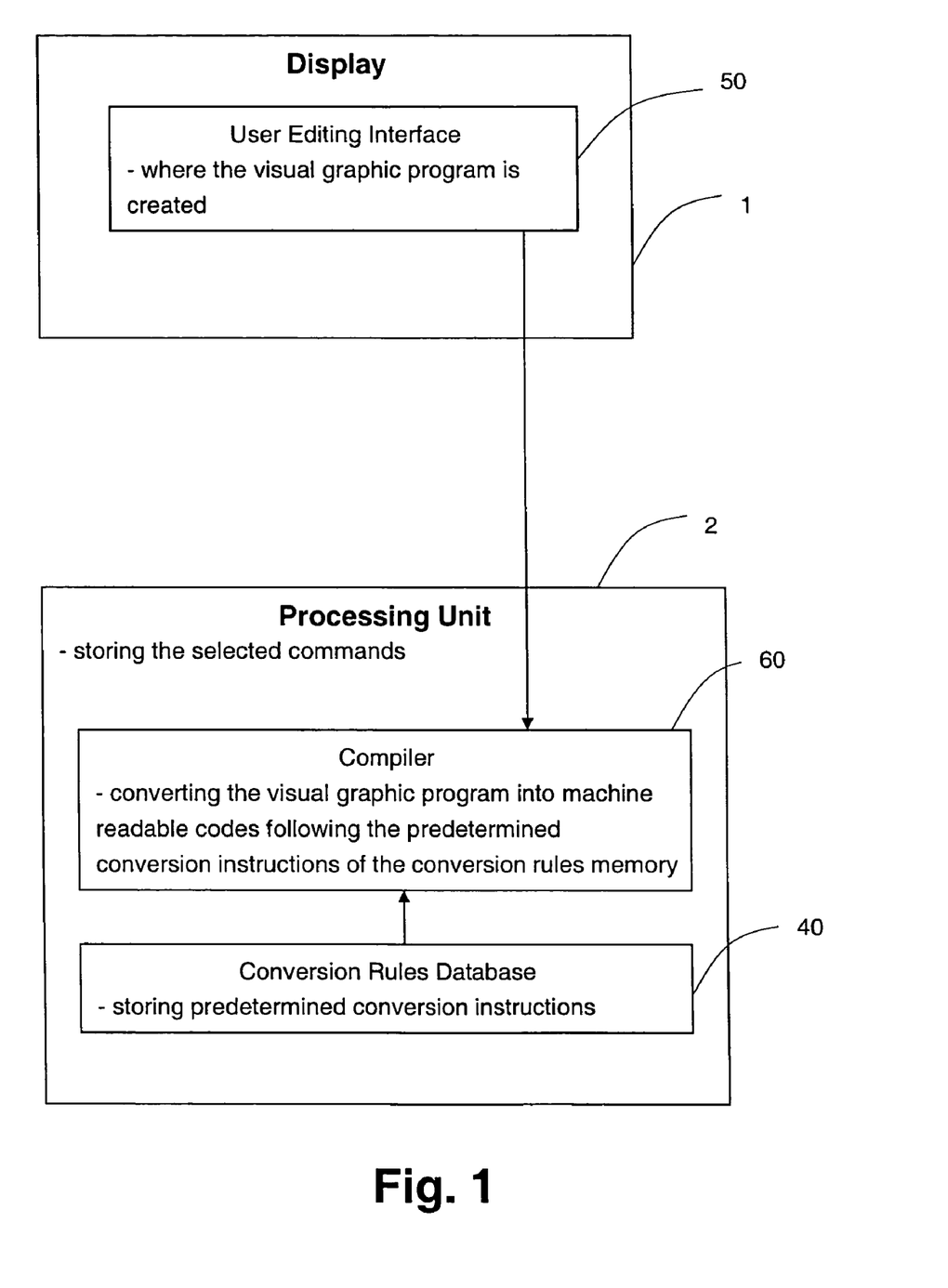
FIG. 1 illustrates the relationship between the user editing interface, compiler and the conversion rules database according to a preferred embodiment of the present invention.

In addition, the conventional human readable source codes of the current program can also convert and arrange the source codes into different function modules 10 and determination modules 20 of the visual graphic program of the present invention according to a conversion rules database 40. The visual programming system also includes a user editing interface 50 to enable the user to construct the visual graphic program by selecting the required function modules 10 and, if necessary, the appropriate determination modules 20 and linking the selected function modules 10 and determination modules 20 by the programming flow lines 30, and a compiler 60 which is used to convert the human readable source code program or the visual graphic program into the machine readable codes of the computer executable language following the predetermined conversion instructions of the conversion rules memory.

The user editing interface 50 comprises user selectable commands, allowing users to create a program by selecting commands from the user editing interface 50 on a human viewable display 1 of the computer, wherein each of the selectable commands has their own predetermined definition, a storing command to create storage spaces inside the processing unit 2 of the computer, wherein after the visual graphic program is designed and completed, the visual graphic program constructed by the function modules 10, the determination modules 20 and the programming flow lines 30 being selected is converted into the machine readable codes.

The conversion rules database 40 comprises predetermined conversion instructions of converting selected application functions of the function module 10 and the determination module 20 to machine readable codes. The compiler 60 comprises a compiling signal receiver to receive the compiling signal from the user editing interface. Upon receiving the compiling signal, the compiler 60 starts to convert the selected application functions of the function module 10 and the determination module 20 into machine readable codes.

Figure 2:
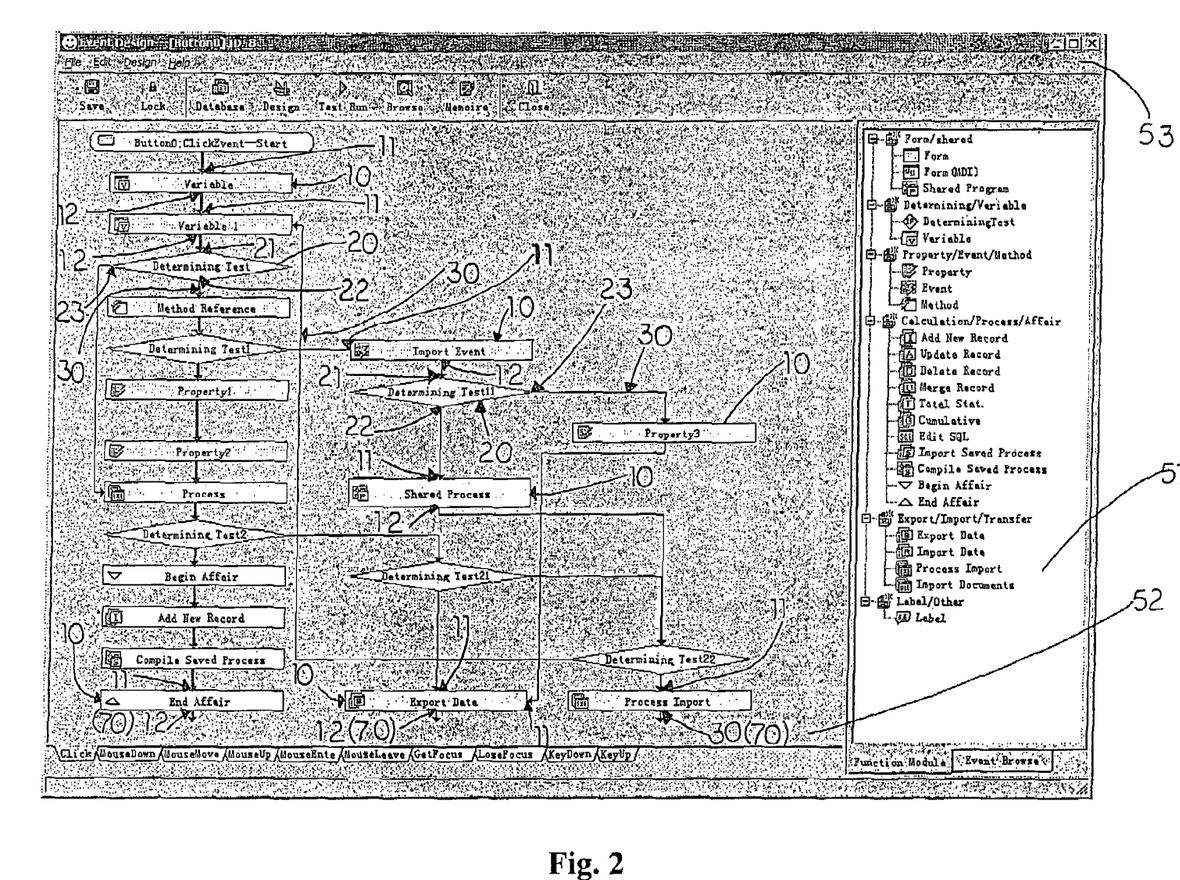
FIG. 2 illustrates the user editing interface and its functions according to the above preferred embodiment of the present invention.

According to FIG. 2, the user editing interface 50 comprises a function module selection panel 51, a selected module panel 52, and an editorial management panel 53. The function module selection panel 51 comprises selectable modules, including determination modules 20 such as those that are equivalent to "If-Then-Else", "Case Loop", "For Loop", "Do-While Loop" in conventional programming languages, programming flow lines 30 representing the direction of flow of the program and functional commands. When a module is selected from the function module selection panel 51, the selected module appears in the selected module panel 52. Arranging the selected modules by connecting them with the programming flowing lines 30 in a flow chart manner can achieve the visual graphic program.

Figure 3:
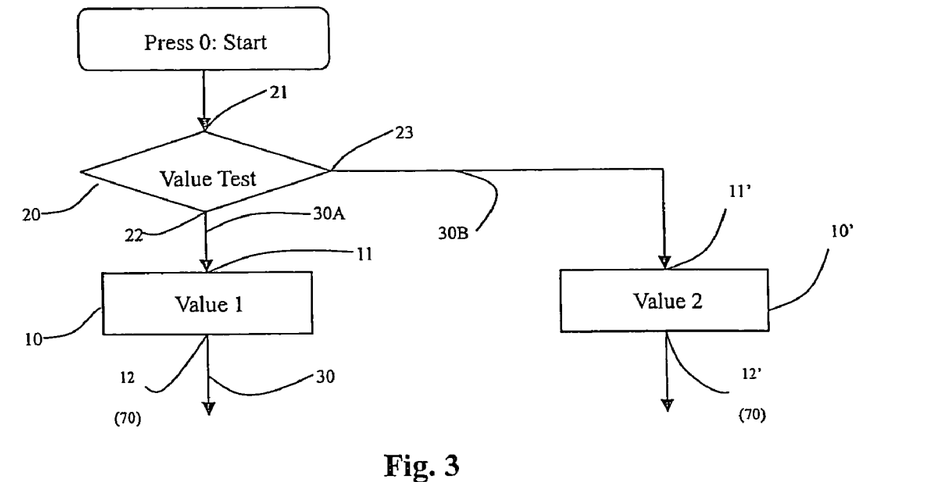
FIG. 3 illustrates a visual graphic program for a value test according to the above preferred embodiment of the present invention.

Referring to FIG. 3, the direction of the programming flow lines 30 represents the executing path of the visual graphic program. When there are two determination results, two programming flow lines 30 will be connected from the determination module 20, wherein when the determination result is "True", the main programming flow line 30A connects from the "True" exit of the determination module 20 to the connecting entrance 11 of the function module 10 to execute the application function of the function module 10, wherein when the determination result is "False", the branch programming flow line 30B connects from the "False" exit of the determination module 20 to the connecting entrance 11 of the function module 10' to execute the application function of the function module 10. There are two types of determination module 20, one type contains "multiple determination entrances and one determination exit" while the other type contains "multiple determination entrances and dual determination exits. When the connecting exit 12 of the function module 10 connected to no module, then such connecting exit 12 automatically becomes an ending point 70 of the visual graphic program.

For example, as shown in FIG. 3, the determination module 20 is selected in the selected module panel 52, the determination module 20 is connected to the visual graphic program by the programming flow line 30 simultaneously, wherein a starting point of the determination module 20 is the determination entrance 21 and two ending points of the determination module 20 are the "True" and "False" exits 22, 23. When the determination result is "True", the executing path of the processing sequence is toward the subsequent function module 10 connected by the programming flow line 30A from the "True" exit 22 which acts as the ending point of the determination module 20 to execute the application function of the function module 10. When the determination result is "False", the executing path of the processing sequence is toward the subsequent function module 10' connected by the programming flow line 30B from the "False" exit 23 which acts as another ending point of the determination module 20 to execute the application function of the function module 10'. Therefore, no matter the determination result is "True" or "False", the processing sequence would find its exit 22 or 23 according to the determination result "True" or "False" to continue and execute the subsequent executable module correspondingly.

Figure 4:
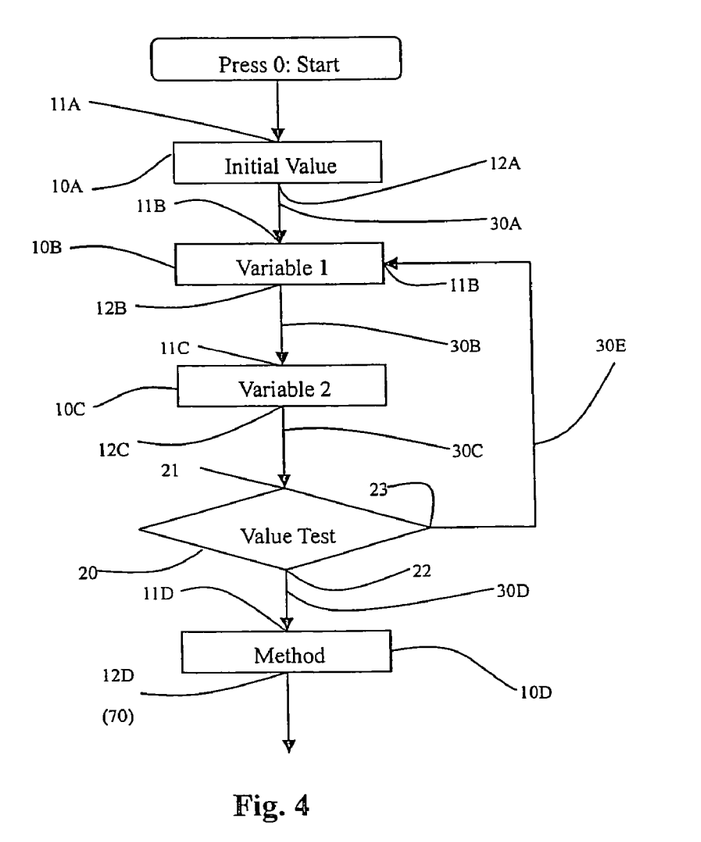
FIG. 4 illustrates a "For Loop" visual graphic program according to the above preferred embodiment of the present invention.

Referring to FIG. 4, a "For Loop" functional program is constructed and produced simply by selecting the following module from the function module selection panel 51 to input into the selected module panel 52:

(i) an "Initial Variable Value" function module 10A.

(ii) a first "Variable Value" function module 10B connected to the "Initial Variable Value" function module 10A via a first programming flow line 30A, wherein the connecting entrance 11B of the first "Variable Value" function module 10B is connected to the connecting exit 12A of the "Initial Variable Value" function module 10A.

(iii) a second "Variable Value" function module 10C connected to the first "Variable Value" function module 10B via a second programming flow line 30B, wherein the connecting entrance 11C of the second "Variable Value" function module 10C is connected to the connecting exit 12B of the first "Initial Variable Value" function module 10B.

(iv) a "Value Test" determination module 20 connected to the second "Variable Value" function module 10C via a third programming flow line 30C, wherein the determination entrance 21 is connected with the connecting exit 12C of the second "Variable" function module 10C by a third programming flow line 30C pointing towards the "Value Test" determination module 20.

(v) a "Method" function module 10D connected from the ending point, the "True" exit 22 thereof, to the "Value Test" determination module 20 via a fourth programming flow line 30D, wherein when the determination result is "False", the processing sequence is exiting from the "False" exit 23 of the "Value Test" determination module 20 to the connecting entrance 11B via the fifth programming flow line 30E so as to connect with the first "Variable Value" function module 10B.

Accordingly, the "For Loop" visual graphic program as shown in FIG. 4 begins with an input of Initial Value, which becomes the Variable 1. Variable 2 is obtained after incrementing Variable 1 according to the program. A Value Test is performed on Variable 2. If the value returned is true, the program continues to the next Method. If the value returned is false, the value of Variable 2 replaces the original value of Variable 1. This incrementing and replacing of value of Variable 1 continues until the returned value of the Value Test is true.

Figure 5:
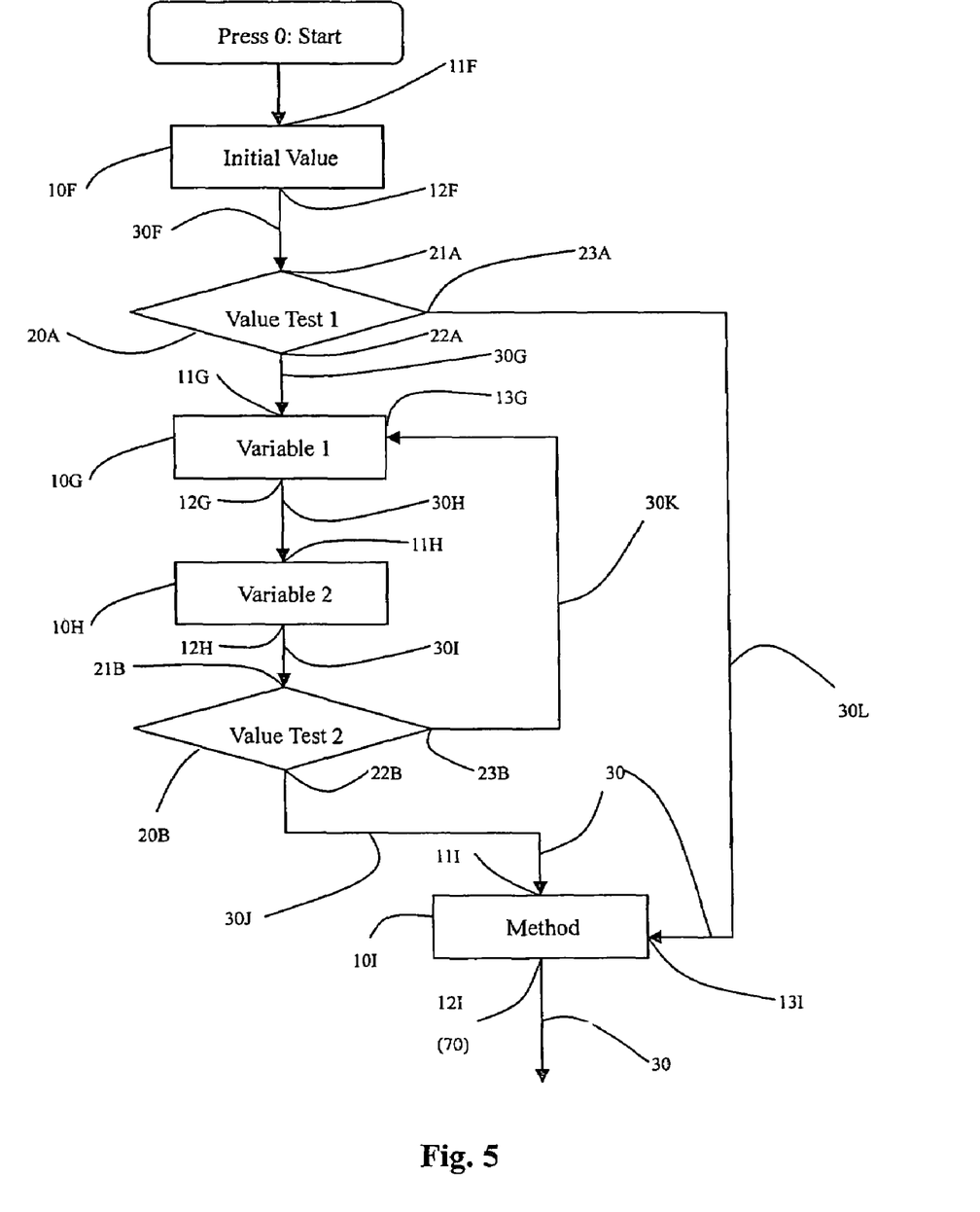
FIG. 5 illustrates a "Do-While Loop" visual graphic program according to the above preferred embodiment of the present invention.

Referring to FIG. 5, a "Do-While Loop" visual graphic program is constructed and produced by selecting the following commands from the function module selection panel 51 to input into the selected module panel 52:

(i) an "Initial Variable Value" function module 10F;

(ii) a first "Value Test" determination module 20A connected with the connecting exit 12F of the "Initial Variable Value" function module 10F via a first programming flow line 30F, wherein the connecting exit 12F is connected to the determination entrance 21A.

(iii) a first "Variable Value" function module 10G connected to the ending point, i.e. a "True" exit 22A, of the first "Value Test" determination module 20A via a second programming flow line 30G, wherein the "True" exit 22A is connected to a connecting entrance 11G of the first "Variable Value" function module 10G.

(iv) a second "Variable Value" function module 10H connected to the ending point, i.e. the connecting exit 12G, of the first "Variable Value" function module 10G via a third programming flow line 30H, wherein the connecting exit 12G is connected to the starting point, i.e. the connecting entrance 11H, of the second "Variable Value" function module 10H.

(v) a second "Value Test" determination module 20B connected with the connecting exit 12H of the second "Variable Value" function module 10H via a fourth programming flow line 30I, wherein the connecting exit 12H is connected to a determination entrance 21B of the second "Value Test" determination module 20B.

(vi) a "Method" function module 10I connected with the second "Value Test" determination module 20B via a fifth programming flow line 30J, wherein a "True" exit 22B of the second "Value Test" determination module 20B is connected to a connecting entrance 11I of the "Method" function module 10I. A sixth programming flow line 30K connects from a "False" exit 23B of the second "Value Test" determination module 20B to another connecting entrance 13G of the first "Variable" function module 10G. A seventh programming flow line 30L connects a "False" exit 23A of the first "Value Test" determination module 20A to another connecting entrance 13I of the "Method" function module 10I.

Accordingly, the Do-While Loop" visual graphic program as shown in FIG. 5 begins with an input of an Initial Variable Value (10F). A Value Test 1 of the determination module 20A is performed on the Initial Value, wherein if the returned value is "False", the program continues to the next "Method" of the function module 10I, wherein if the returned value is "True", then the application function of the function module 10G for Variable 1 is executed. Variable 2 is obtained after incrementing the Variable 1 in the function module 10H according to the program. The Value Test 2 of the determination module 20B is performed after the execution of the Variable 2, wherein if the value returned is "True", the program continues to the "Method" of the function module 10I, wherein if the returned value is "False", return to the function module 10G of the Variable 1 to repeat the process until the returned value of the Value Test 2 of the incrementing Variable 2 in the determination module 20B is "True".

Alternatively, the conversion rules database 40 also comprises predetermined reverse conversion instructions of converting machine readable codes to human understandable codes. When imported into the user editing interface 50, the machine readable codes of a designed program are converted to human understandable codes, and appear in the selected module panel 52 in the form of a flow chart type visual graphic display. Users can edit the designed program by adding or taking away the function modules 10 or the determination modules 20 of the designed programs through selecting the modules 10, 20 from the function module selection panel 23 or deleting the modules 10, 20 from the selected module panel 22. By compiling and storing the edited codes, the originally designed program can now perform functions according to the preference of the user. Users can easily customize any designed programs so as to satisfy personal needs for any particular software.

To produce new software, there is no need to write the readable source codes. Sets of corresponding machine readable codes of computer executable languages for specific application functions are stored in a computer for the function modules 10 and the determination modules 20 respectively. The connection of the function and determination modules 10, 20 in the visual graphic program by programming flow lines 30 converts and combines the sets of machines readable codes to continuously execute the modules 10, 20 one after another in a designated manner or to obtain branching process through the determination modules 20 to form the human viewable visual graphic program in the selected module panel 52 on the display 1. When the visual graphic program as shown in the selected module panel 52 is compiled by the compiler 60 in the processing unit 2, the visual graphic program is converted into machine readable codes to process correspondingly.

In other words, when the users want to amend or modify the processing machine readable codes, the users may simply add or delete the function and determination modules 10, 20 and re-arrange and connect them with the programming flow lines 30. The processing machine readable codes will accordingly be changed automatically or after the amended visual graphic program is compiled. In other words, there is no need for a programmer to learn and memorize all kinds of rules and syntax of the programming languages in order to write a program. In fact, a reasonable person who has minimum knowledge of programming, such as who can read flow chart, can be a programmer to write and amend a visual graphic program of the present invention. The users can change and amend their software to fit their specific personal use and operation. The programming becomes so easy and efficient by means of the visual programming method and system of the instant invention.

The visual graphic program can also be applied to existing programs by incorporating a user editing interface which provides an interface to analyze the source codes according to their different functions and determining tests programmed into different sets of source codes which are represented by the function modules 10 and the determination modules 20 correspondingly. Therefore, the existing program can also be displayed in form of visual graphic program in the selected module panel 52 by connecting function modules 10 and determination modules 20 by programming flow lines 30 in a corresponding pattern. When the users want to amend the program, the users may also simply add or delete the function and determination modules 10, 20 and rearrange and connect them with programming flow lines 30. A compiler 60 is also incorporated in the existing program and the source codes will be changed correspondingly by means of the user editing interface after the amended visual graphic program is compiled by the compiler 60. The machine readable codes will be changed according to the new source codes.

By means of the visual programming system described above, a program can be produced by a visual programming method without the need of writing source codes, wherein the visual programming method comprises the steps of:

(a) assigning one or more function modules 10 each of which is provided with an applicable functional program or command stored in computer executable language in a processing unit 2 to accomplish a substantial applicable function;

(b) assigning one or more determination modules 20 each of which is provided with a determining test stored in computer executable language in the processing unit 2;

(c) connecting the function modules 10 and determination modules 20 in a predetermined sequence with programming flow lines 30 each pointing from one direction to another to construct a visual graphic program; and (d) compiling the visual graphic program to machine readable codes, wherein the logical execution sequence of the program is designated and illustrated through the connection of the modules 10, 20 with the programming flow lines 30 so as to construct a finish program in the computer executable language in the processing unit 2.

As disclosed above, each of the function modules 10 has a starting point, i.e. the connecting entrance 11, and an ending point, i.e. the connecting exit 12, and each of the determination modules 20 has a starting point, i.e. the determination entrance 21 and two ending points for "True" and "False", i.e. the "True" exit 22 and the "False" exit 23.

To amend a visual graphic program of the present invention is as simple as by:

(i) adding one or more function modules 10 or determination modules 20 and connecting them with the specific function modules 10 or determination modules 20 in the visual graphic program with one or more programming flow lines 30; or (ii) deleting one or more function module 10 or determination modules 20 from the visual graphic program and re-arranging the programming flow lines 30; or (iii) replacing one or more function modules 10 or determination modules 20 with other function modules or determination modules with other applicable functional programs or commands or determining tests.

In view of the operation by a user, the present invention further provides a method of allowing computer programs to be inputted without using advanced programming languages, wherein the method comprises the steps of:

(a) establishing a conversion rule database containing conversion instructions of converting selectable commands to machine readable codes;

(b) providing a selection platform, wherein the selectable commands are listed out for a user to select a set of selected commands according to a desired flow of functions to be performed; and (c) compiling the selected commands into machine readable codes according to the set of conversion instructions.

In addition, before the step (c), the method further comprises a sub-step of storing the selected commands inside a processing unit.

In view of an existing program for user, the present invention provides a method of allowing a designed computer program to be customized without using advanced programming languages, wherein the method comprises the steps of:

(a) establishing a reverse conversion rule database containing reverse conversion instructions of reverse converting machine readable codes of the designed computer program to human understandable codes;

(b) establishing a set of conversion rule database containing conversion instructions of converting selectable commands to machine readable codes;

(c) providing an imported code viewing platform, wherein the machine readable codes of the designed computer program are converted to and listed out as the human understandable codes according to the reversion conversion instructions;

(d) providing an editing platform, wherein selectable commands are listed out for a user to insert selected commands into the human understandable codes and deleting sections of the human understandable codes, forming a set of edited codes, according to a desired flow of functions to be performed; and (e) compiling the edited codes into machine readable codes following the set of conversion rules.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A visual programming system, comprising:
a processing unit comprising:
a plurality of functional modules each of which is pre-loaded with an applicable functional program which is part of a parent computer program designed to accomplish a predetermined objective, wherein each of said functional programs is developed to perform a predetermined operation, and is written in a computer-executable language and is displayed as a high-level computing language as human readable codes;

a plurality of determination modules electrically communicated with at least one of said functional modules, wherein each of said functional modules is pre-loaded with a determination program developed to perform a predetermined decision regarding an information flow between said functional modules and said determination modules, wherein each of said determination programs is written in a computer-executable language and is displayed as a high-level computing language as human readable codes; and a user editing interface electrically communicated with said determination modules and said functional modules, in such a manner that a user is capable of individually accessing said applicable functional programs in said functional modules and said determination programs in said determination modules via said user editing interface for individually modifying said applicable functional programs and said determination programs in said human readable codes, so as to allow said user to conveniently and easily manage and amend said parent computer program by individually and selectively modifying said applicable functional programs and said determination programs without running an exhaustive debugging and re-programming procedure of said entire parent computer program in lengthy sources codes of said parent computer program.

2. The visual programming system, as recited in claim 1, wherein each of said determination programs has a determining test stored in said computer executable language for generating a true result and a false result when information from said corresponding functional module is inputted to said determining test, wherein each of said determination modules contains a determination input for receiving said information generated from said corresponding applicable functional program, a "True" output electrically connecting with said corresponding functional module for directing said information thereto when a result of said determining test is true, and a "False" output electrically connecting with another of said corresponding functional module for directing said information thereto when a result of said determining test is false.

3. The visual programming system, as recited in claim 2, wherein each of said functional modules contains at least a connecting input and a connecting output for electrically connecting with other one of said functional modules and said determination modules for facilitating information flow between said functional modules and said determination modules within said parent computer program.

4. The visual programming system, as recited in claim 3, further containing a plurality of information flow lines visibly connecting said functional modules and said determination modules for accurately indicating said information flow between said functional modules and said determination modules within said parent computer program, wherein said information flow lines are visibly displayed by said user editing interface for allowing said user to conveniently and easily modify said information flow between said functional modules and said determination modules.

5. The visual programming system, as recited in claim 4, further comprising a complier electrically communicated with said functional modules and said determination modules for converting said human readable codes in said high-level computer language into said computer-executable language.

6. The visual programming system, as recited in claim 5, wherein said user editing interface comprises a function module selection panel, a selected module panel, and an editorial management panel, wherein said function module selection panel is adapted to selectively initiate commands for controlling said information flow between said functional modules and said determination modules, wherein when said command is selected from said function module selection panel, said command being selected appears in said selected module panel and, by arranging said commands being selected into a flow chart form, said user is able to manage, with visual assistance from said information flow lines, said corresponding applicable functional programs and said determination programs and said information flow.

7. The visual programming system, as recited in claim 1, wherein each of said functional modules contains at least a connecting input and a connecting output for electrically connecting with other one of said functional modules and said determination modules for facilitating information flow between said functional modules and said determination modules within said parent computer program.

8. The visual programming system, as recited in claim 7, further containing a plurality of information flow lines visibly connecting said functional modules and said determination modules for accurately indicating said information flow between said functional modules and said determination modules within said parent computer program, wherein said information flow lines are visibly displayed by said user editing interface for allowing said user to conveniently and easily modify said information flow between said functional modules and said determination modules.

9. The visual programming system, as recited in claim 8, further comprising a complier electrically communicated with said functional modules and said determination modules for converting said human readable codes in said high-level computer language into said computer-executable language.

10. The visual programming system, as recited in claim 9, wherein said user editing interface comprises a function module selection panel, a selected module panel, and an editorial management panel, wherein said function module selection panel is adapted to selectively initiate commands for controlling said information flow between said functional modules and said determination modules, wherein when said command is selected from said function module selection panel, said command being selected appears in said selected module panel and, by arranging said commands being selected into a flow chart form, said user is able to manage, with visual assistance from said information flow lines, said corresponding applicable functional programs and said determination programs and said information flow.

11. The visual programming system, as recited in claim 1, further containing a plurality of information flow lines visibly connecting said functional modules and said determination modules for accurately indicating said information flow between said functional modules and said determination modules within said parent computer program, wherein said information flow lines are visibly displayed by said user editing interface for allowing said user to conveniently and easily modify said information flow between said functional modules and said determination modules.

12. A visual programming method, comprising the steps of:
(a) developing a plurality of functional modules each of which is preloaded with an applicable functional program which is part of a parent computer program designed to accomplish a predetermined objective, wherein each of said functional programs is developed to perform a predetermined operation, and is written in a computer-executable language and is displayed as a high-level computing language as human readable codes;
(b) developing a plurality of determination modules electrically communicated with at least one of said functional modules, wherein each of said functional modules is pre-loaded with a determination program developed to perform a predetermined decision regarding an information flow between said functional modules and said determination modules, wherein each of said determination programs is written in a computer-executable language and is displayed as a high-level computing language as human readable codes; and
(c) accessing said applicable functional programs in said functional modules and said determination programs in said determination modules via a user editing interface for individually modifying said applicable functional programs and said determination programs in said human readable codes, wherein said user is allowed to conveniently and easily manage and amend said parent computer program by individually and selectively modifying said applicable functional programs and said determination programs without running an exhaustive debugging and re-programming procedure of said entire parent computer program in lengthy sources codes of said parent computer program.

13. The method, as recited in claim 12, said step (c) comprises a step of compiling said human readable codes by a complier electrically communicated with said functional modules and said determination modules for converting said human readable codes in said high-level computer language into said computer-executable language.

14. The method, as recited in claim 13, wherein in said step (b), each of said determination programs has a determining test stored in said computer executable language for generating a true result and a false result when information from said corresponding functional module is inputted to said determining test, wherein each of said determination modules contains a determination input for receiving said information generated from said corresponding applicable functional program, a "True" output electrically connecting with said corresponding functional module for directing said information thereto when a result of said determining test is true, and a "False" output electrically connecting with another of said corresponding functional module for directing said information thereto when a result of said determining test is false.

15. The method, as recited in claim 14, further comprises a step, in between said step (b) and said step (c), of developing a plurality of information flow lines visibly connecting said functional modules and said determination modules for accurately indicating said information flow between said functional modules and said determination modules within said parent computer program, wherein said information flow lines are visibly displayed by said user editing interface for allowing said user to conveniently and easily modify said information flow between said functional modules and said determination modules.

16. The method, as recited in claim 15, wherein each of said functional modules contains at least a connecting input and a connecting output for electrically connecting with other one of said functional modules and said determination modules for facilitating information flow between said functional modules and said determination modules within said parent computer program.

17. The method, as recited in claim 12, wherein in said step (b), each of said determination programs has a determining test stored in said computer executable language for generating a true result and a false result when information from said corresponding functional module is inputted to said determining test, wherein each of said determination modules contains a determination input for receiving said information generated from said corresponding applicable functional program, a "True" output electrically connecting with said corresponding functional module for directing said information thereto when a result of said determining test is true, and a "False" output electrically connecting with another of said corresponding functional module for directing said information thereto when a result of said determining test is false.

18. The method, as recited in claim 17, further comprises a step, in between said step (b) and said step (c), of developing a plurality of information flow lines visibly connecting said functional modules and said determination modules for accurately indicating said information flow between said functional modules and said determination modules within said parent computer program, wherein said information flow lines are visibly displayed by said user editing interface for allowing said user to conveniently and easily modify said information flow between said functional modules and said determination modules.

19. The method, as recited in claim 18, wherein each of said functional modules contains at least a connecting input and a connecting output for electrically connecting with other one of said functional modules and said determination modules for facilitating information flow between said functional modules and said determination modules within said parent computer program.

20. The method, as recited in claim 12, wherein each of said functional modules contains at least a connecting input and a connecting output for electrically connecting with other one of said functional modules and said determination modules for facilitating information flow between said functional modules and said determination modules within said parent computer program.

* * * * *